United States Patent [19]
Johnson

[11] 4,014,421
[45] Mar. 29, 1977

[54] CLUTCHING MEANS ADAPTED FOR USE IN TAPPING ATTACHMENTS

[75] Inventor: Allan S. Johnson, Newport Beach, Calif.

[73] Assignee: Tapmatic Corporation, Irvine, Calif.

[22] Filed: July 28, 1975

[21] Appl. No.: 599,783

Related U.S. Application Data

[63] Continuation-in-part of Ser. No. 520,409, Nov. 4, 1974, Pat. No. 3,946,844, and Ser. No. 508,344, Sept. 23, 1974, abandoned.

[52] U.S. Cl. .............................. 192/48.91; 74/801; 192/51; 192/67 R; 408/139
[51] Int. Cl.² .................. F16D 11/00; F16D 21/06
[58] Field of Search ......... 192/21, 51, 48.91, 67 R; 408/139; 74/801

[56] References Cited
UNITED STATES PATENTS

| 2,291,151 | 7/1942 | Dunn | 192/67 R X |
| 2,544,809 | 3/1951 | Stanley | 192/48.91 X |
| 2,743,804 | 5/1956 | Roberts | 192/48.91 |
| 3,050,321 | 8/1962 | Howe et al. | 192/67 R X |
| 3,051,013 | 8/1962 | Zagar | 192/21 X |
| 3,871,498 | 3/1975 | Kitaguchi | 192/48.91 |

*Primary Examiner*—Allan D. Herrmann
*Attorney, Agent, or Firm*—Herzig & Walsh, Inc.

[57] ABSTRACT

The invention is an improved clutching means for driving between axially aligned parts and is particularly adaptable in tapping attachments having free axial float. Direct and reverse drive is provided for by way of planetary gears for driving in direct and reverse drive in an exemplary attachment in which the clutching means is embodied. Spring biased clutch drive means is provided for both the direct and reverse drive. The clutch drive means is in the form of a sleeve having a ball race carrying driving balls interposed between axial splines on a driving part and on the driven splindle part. The splines have arcuate side surfaces to conform to the driving balls providing for substantially frictionless drive in both direct and reverse modes, the balls being free to roll. The splines are especially configurated to facilitate engagement of the balls with them. A single drive sleeve is resiliently carried by one of the parts for providing both direct and reverse drive.

13 Claims, 5 Drawing Figures

CLUTCHING MEANS ADAPTED FOR USE IN TAPPING ATTACHMENTS

This application is a continuation-in-part of Ser. No. 508,344 filed on Sept. 23, 1974 now abandoned and of application Ser. No. 520,409 filed Nov. 4, 1974 now Pat. No. 3,946,844.

BACKGROUND OF THE INVENTION

1. Field of the Invention

The field of the invention is that of clutching means for providing drive between axially aligned members and is particularly adapted for tapping attachments. The exemplary form of the invention is embodied in a tapping attachment of the type having free axial float and providing for both direct and reverse drive. Improvements are provided in the device as described in detail herein, particularly adapting it for substantially frictionless drive of the tapping spindle. The drive is through clutch means which provides for engagement and disengagement without chattering. The drive is through ball members engageable with splines of special configuration to accommodate the purposes described hereinafter.

2. Description of the Prior Art

The background of the invention with respect to tapping attachments is exemplified in prior patents of this inventor U.S. Pat. Nos. 3,002,206; 3,041,893; 3,397,588; 3,717,392; and 3,791,756, which are hereby incorporated herein by reference. Reference is also made to U.S. Pat. No. 2,325,184. The background patents disclose the characteristics of tapping attachments having free axial float and direct and reverse drive.

U.S. Pat. No. 3,002,206 shows a type of spindle suspension similar to that disclosed herein. U.S. Pat. No. 3,397,588 discloses a type of construction wherein for the direct drive there is provided a spring biased clutch driver member which functions to eliminate chattering, when the clutch engages or disengages for direct drive. A similar clutch driver member may be and has been embodied in attachments having reverse drive as in U.S. Pat. No. 3,717,892. The herein invention improves particularly on the clutch driver means and its cooperation with the drive means and the spindle. The invention is an improvement of the structure of application Ser. No. 520,409 filed Nov. 4, 1974, which is hereby incorporated herein by reference. U.S. Pat. Nos. 3,041,893; 3,397,588; and 3,717,892 are also incorporated herein by reference.

SUMMARY OF THE INVENTION

The improvements of the herein invention are adapted to realizing the objective that the drive of the floating spindle in a tapping attachment is accomplished substantially without friction, while still having the advantages and capabilities of the patents referred to. The realization of this end is an objective of the invention. The reverse drive is by way of planetary gears in such a way that the driving speed can be the same in direct drive as in reverse drive or it can be different. The clutch driver means provides drive through balls carried by a spring biased sleeve (clutch driver member). The balls engage between axial splines on a clutch driving member and on the tapping spindle, the splines having arcuate sides corresponding to ball radius allowing the balls to rotate while moving axially providing substantially frictionless drive. The clutch driving member in the preferred embodiment is a single sleeve or ball retainer, resiliently carried by the spindle, the balls providing for driving engagement between splines on the clutch driver member and on the spindle.

The spindle moves axially to provide for engagement for direct drive and for engagement and disengagement for reverse drive.

This invention facilities the engagement of the driving balls with the splines both in direct and reverse drive. It may be seen that whenever the balls move axially so as to engage the splines upon contacting the splines the contact will be made with an arcuate or grooved surface, which by cam action causes the balls to roll essentially without friction into desired positions for engagement with grooves at one side or the other of the splines.

As may be observed, the invention basically is an improved clutching arrangement which facilitates clutching engagement between a driving and driven member and improves the driving relationship.

The specific nature of the improvements are described in detail hereinafter in connection with preferred exemplary forms of the invention.

In the light of the foregoing, further specific objects of the invention are as follows:

A further object is the realization of a tool of this type, having the improved characteristics set forth and with a very few parts subject to wear, and having long and maintenance free life.

A further object is to realize a tool of this type wherein the danger of damage or breakage of the tool when operated is minimized.

A further object is to achieve or realize the foregoing objects by way of specific improvements, residing in a ball carrier having ball driving members interposed between rotating parts carried by one of the parts and co-operating with splines on one of the parts, the carrier being resiliently biased for axial movement in either direction.

Further objects and additional advantages of the invention will become apparent from the following detailed description and annexed drawings wherein:

DESCRIPTION OF THE PREFERRED EMBODIMENT

Figure 1:
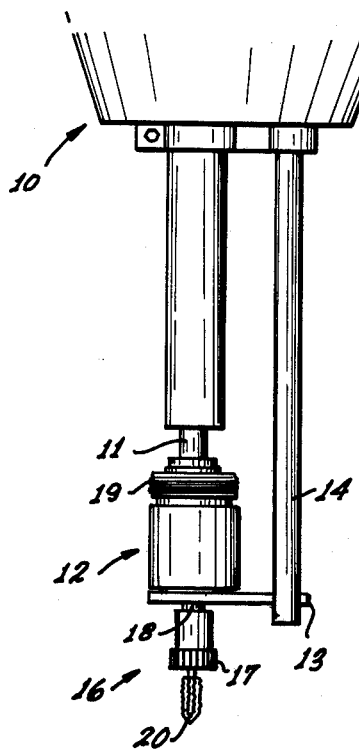
FIG. 1 is a view of a preferred form of the tapping attachment mounted on a machine.

Referring now more in detail to the various figures of the drawing, numeral 10 designates a machine tool with which the attachment embodying the invention may be used. It has an arbor 11 and the tapping attachment is designated generally at 12. Numeral 13 designates a radial holding arm which engages a stop rod or column 14 which will hold the body of the attachment against rotation as will be described more in detail hereinafter. Numeral 16 designates the chuck on the tapping spindle 18 and the tap itself is designated at 20.

Numeral 18 designates the driven spindle carrying tap chuck 16 and 17 nut which holds the tap 20. See FIG. 1. The tap chuck nut 17 and tap 20 are conventional and may be like those shown in the earlier application and patents referred to.

Figure 2:
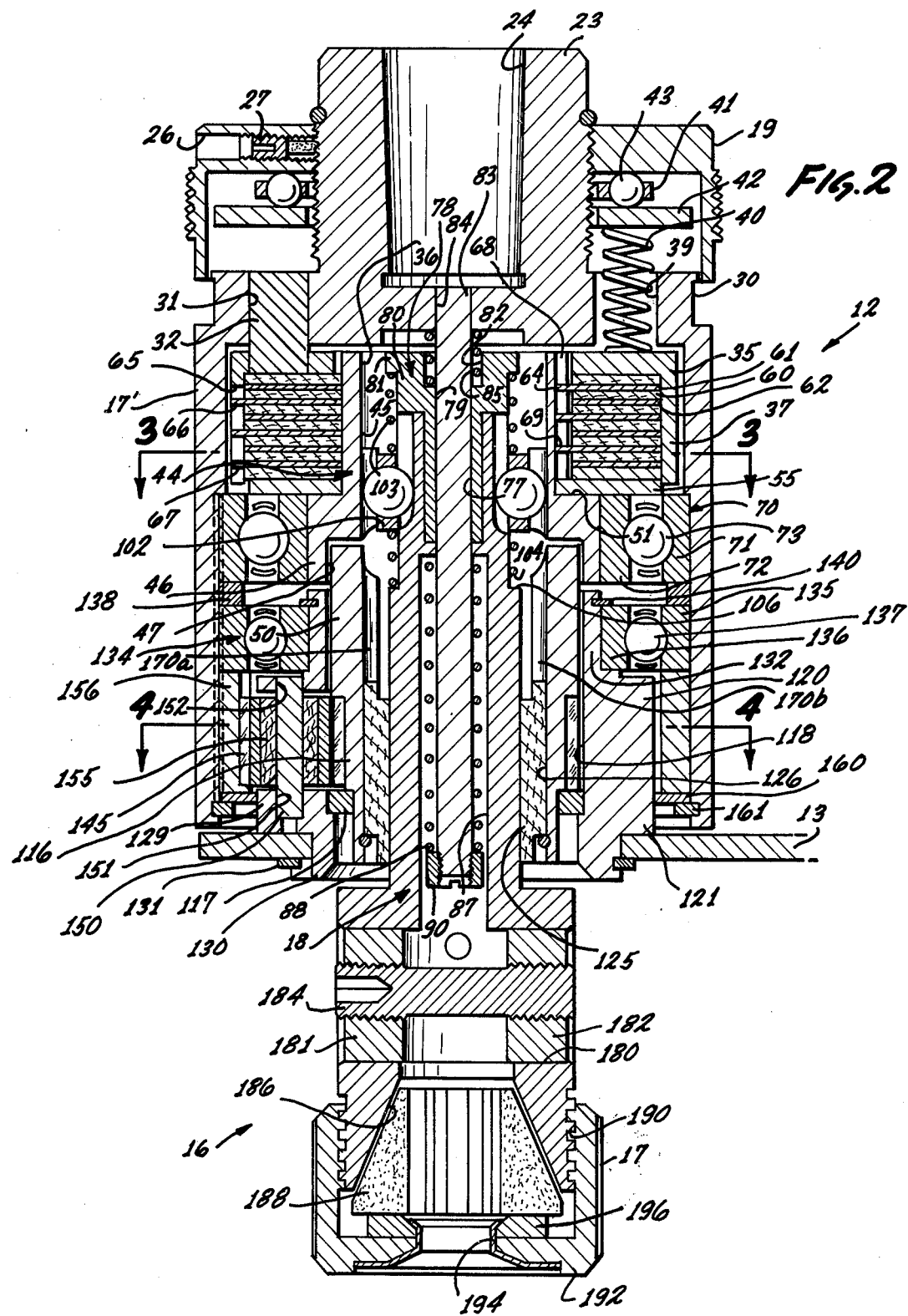
FIG. 2 is a cross-sectional view of the tapping attachment of FIG. 1.

FIG. 2 shows the attachment 12 in cross-section. The attachment has a cylindrical body 17 having an upwardly extending part 23 having external threads. The lower part is cylindrical and hollow as shown. The part 23 has a tapered bore 24 in which is received the end of the drive stem or spindle 11. Numeral 19 designates a knurled adjusting cap. The cap 19 is externally knurled as described and threads onto the part 23. The cap 19 has a radial bore 26 which is threaded to receive the lock set screw 27. The cap 19 cooperates with the clutch mechanism as will be described, for adjusting the amount of torque that can be transmitted.

The intermediate part of the body 23 as designated at 30 has three angularly spaced axial bores as shown at 31 in which are received pins 32 which extend into and drive the clutch driver member 35 which is a circular member having a central bore 36 and a depending skirt 37. The part 30 of body 23 has three additional bores 39 and in these bores are coil springs as designated at 40. One end of these springs seats on the clutch driver member 35 and the other ends seat on the spring plate 42 in the cap 19. A thrust bearing is interposed between spring plate 42 and the inside surface of the top of cap 19. This thrust bearing comprises ball ring 41 having openings with balls 43 in them.

Numeral 44 designates the clutch sleeve. This part is cylindrical having a bore 45. It has an enlarged lower skirt part 46 having a counterbore 47 in which is received the upper end of the reversing clutch drive sleeve 50. The enlarged part of clutch sleeve 44 forms a square shoulder 51 and on this shoulder rests the primary internal clutch plate ring 55. The clutch elements are disposed between the clutch driver 35 and the primary internal clutch plate ring 55. The clutch comprises alternating fiber disc plates 60 and metal discs 61 and 62.

The depending skirt 37 has slots shown at 65 in which are received projections 66 and 67 extending from certain of the metal disc plates so as to drive these plates. The upper part of the clutch sleeve 44 has external axial slots as shown at 68, 68' and 68" in which are received projections as shown at 64 and 69 extending from alternate metal plates so that these plates can drive the clutch sleeve 44. The metal disc plates are rotated by frictional engagement with the fiber disc plates and in this manner the clutch sleeve is driven. The frictional engagement between the plates depends upon the adjustment of the cap 19 and the force thereby exerted through the springs 40.

The disc clutch rests on internal clutch plate ring 55 over bearing 70, which has an outer ball race 71, an inner ball race 72 and interposed balls 73, this bearing being within the body 17. Clutch sleeve 44 rotates in this bearing for direct drive.

Numeral 18 designates the driven spindle which is cylindrical having an end bore 77. Fitting within its upper end is a bushing 78 having a bore 79 and having an upper end part 80 of 81 larger diameter which fits against the end of spindle 18 and which has a spring retaining flange 81. It has a counterbore 82. Numeral 83 designates a suspension rod or stem extending from bore 84 in part 83 and which extends through bore 79 in bushing 78. Coil spring 85 is around stem 83 seated in counterbore 82 and bearing against body 23.

Spindle 83 has another bore 87. Stem 83 extends into this bore. In the bore around stem 83 is coil spring 88 which is retained by screw cap 90 on the end of stem 83. The spring normally urges the spindle upwardly.

Figure 3:
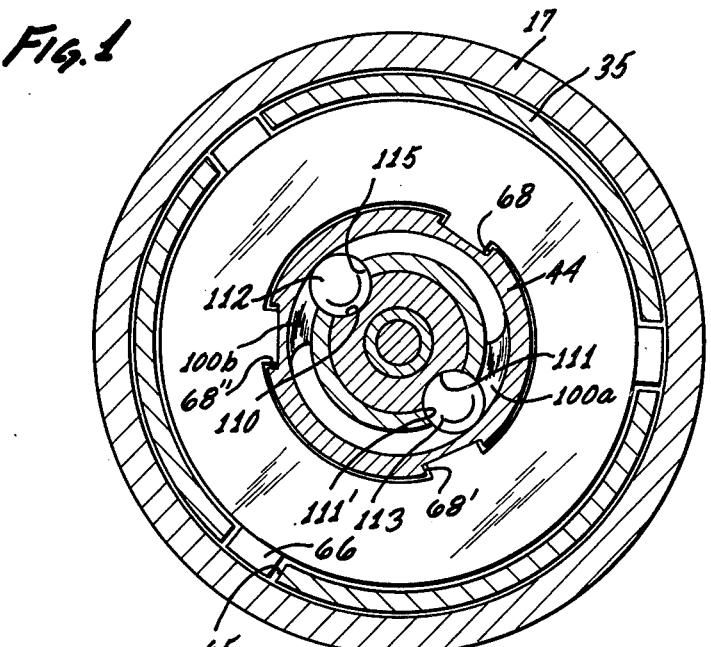
FIG. 3 is a sectional view taken along the line 3—3 of FIG. 2.

The clutch sleeve 44 has a bore 45 in which are axial ways formed by splines 100a and 100b which engage with and drive balls that are carried by a direct drive clutch driver member 102 as will be described. The relationship of the parts as so far described may be observed by considering the sectional views FIGS. 2 and 3.

Numeral 102 designates the clutch driver member or sleeve for both direct drive and for reverse drive.

The clutch driver member 102 is a sleeve carried on spindle 18. It is cylindrical and is biased by springs 103 and 104 bearing respectively against flange 81 and a shoulder 106 on spindle 18. The angularly spaced splines 100a and 100b have arcuate sides to conform to the radius of driving balls as will be described. Sleeve 102 forms a ball race or retainer and formed in it are two equally angularly spaced ball receiving openings 110 and 111 (see FIG. 3). Received in the openings are driving balls 112 and 113. The balls engage the splines 100a and 100b on spindle 18 (see FIGS. 2 and 3). The splines have arcuate axial sides of a radius conforming to that of the balls, and their lower ends are also arcuate. Balls 112 and 113 move axially in grooves 111 and 115 in spindle 18.

Figure 4:
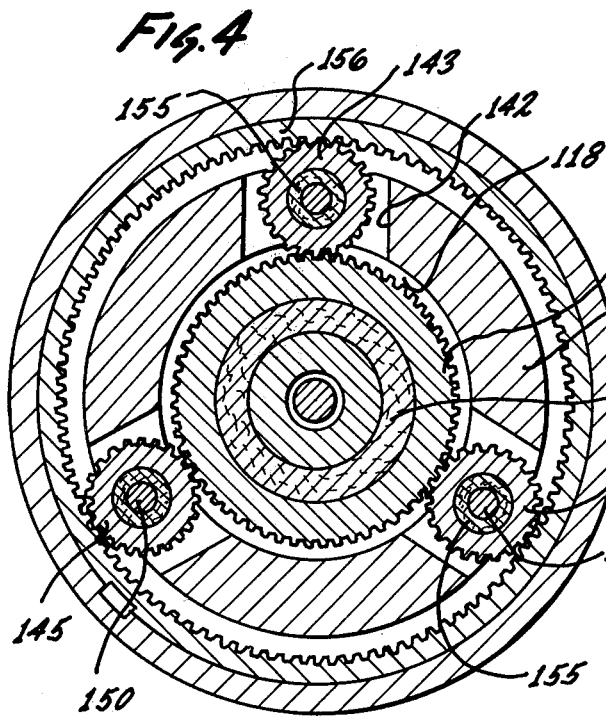
FIG. 4 is a sectional view taken along line 4—4 of FIG. 2.

Numeral 50 designates the reversing drive sleeve which carries the reverse drive gear 116. The reversing sleeve 50 is driven in reverse direction. Its lower end rests on thrust washer 117. Its upper part fits within the skirt 46. It is within bore 118 of of planetary gear carrier body 120 the large part 121 of which is of smaller diameter and carrying arm 13. Body 120 has openings for three planetary gears. The gear 116 is driven by a planetary gear mechanism. The driven spindle 18 rotates within spindle bearing 125 which is within the lower part of the reversing sleeve 50 in a counterbore 126. Numeral 120 designates the gear carrier of the planetary gear train which is secured at the lower part thereof to the stop arm 13, the gear carrier having a part 130 at the bottom of smaller diameter and this part extends through the stop arm 13 and is secured by a Truarc ring 131. The upper part of the gear carrier 120 is of smaller diameter as shown at 132, and it rotates within a ballbearing 134 comprising an outer ball race 135, an inner ball race 136 and a set of balls as designated at 137, the ballbearing being held in place by a Truarc ring 140. This bearing is spaced from bearing 70 by spacer ring 138. The gear carrier has a group of spaces or openings in it as shown at 142 in FIG. 4 in which are positioned the planetary gears 143, 144, and 145. Each of these gears as shown is mounted on a pin as shown at 150 in FIG. 2. These pins are mounted in the gear carrier 120. As shown in FIG. 2, the lower end of the pin 150 is mounted in a bore 151 in a part of the gear carrier 129 and the upper end of this pin is mounted in a similar upper bore 152 in the gear carrier 129. Each of the pins 150 rotates in a planet bearing or bushing as designated at 155, made of suitable bearing material such as oil impregnated bronze. The planet gears are similarly mounted as described and they mesh with the ring gear 156 which fits within the inside of the cylindrical housing 17 as shown. Numeral 160 designates a gear washer below the ring gear 156 and below this washer is a Truarc ring 161.

Provided in bore 126 of reverse drive sleeve 50 are a pair of splines 170a and 170b which are like splines 100a and 100b. Their upper ends are arcuate. As will be described they engage balls 112 and 113 for reverse drive.

The tap holder or chuck 16 is of conventional construction, being a cylindrical shape, having a bore at 180 with tap holding jaws 181 and 182, actuatable by threaded stem 184. The lower end of the bore 186 is flared outwardly or tapered as shown in 186. In this tapered part is received an expansible, collapsible tap collet 188, adapted to receive and hold tap 20. The end of the spindle is threaded as shown at 190 to receive the chuck nut 192. Between the chuck nut 192 which has a bore 194 and the collet 188 is a washer 196, having a tapered bore as shown.

OPERATION

The tap holding spindle has the characteristic of free axial float which is limited as described in the foregoing, the axial float being like that described in the previous patents. The tap follows its own lead. No lead pressure is applied. The machine moves the machine spindle behind the lead of the tap until the desired depth is reached. In operation, it will be understood that the attachment as it starts tapping, moves forwardly with spindle 18 advancing relatively to the housing 17. When the tool reaches the limit of its travel the balls 112 and 113 will move down with the clutch driver member 102 as shown in FIG. 2, the splines on spindle 18 moving down relatively. Since the balls can roll while moving axially, the drive is transmitted substantially without friction. When the balls as shown in FIG. 2 reach the ends of splines 100a and 100b, the clutch releases, without friction or chattering. The clutch driver member disengages without knocking or chattering.

Figure 5:
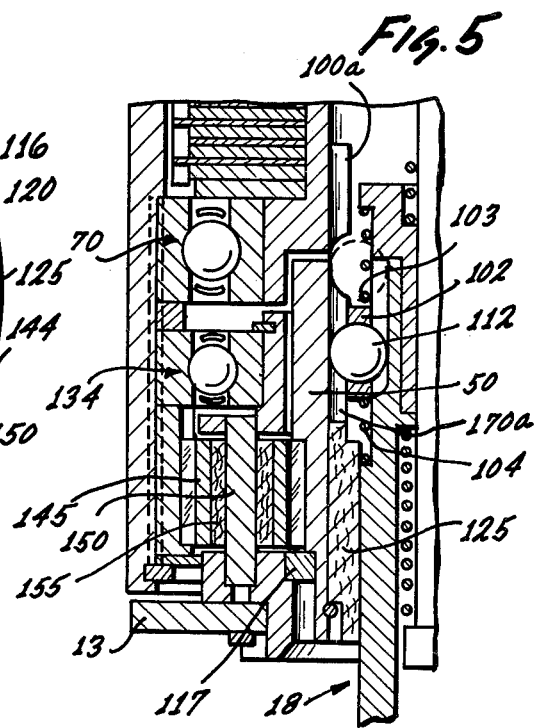
FIG. 5 is a partial view similar to FIG. 2 showing the parts in reverse drive position.

FIG. 5 shows the spindle 18 having moved down bringing balls 112 and 113 into engagement with splines 170a and 170b for reverse drive. Since balls 112 and 113 can move axially resiliently in either direction no jamming or binding occurs when the balls engage either the direct or reverse drive splines.

The neutral position of the spindle in between direct and reverse drive can be very sensitive; that is, very narrow. The spindle preferably feeds in and out at the same rate and drives at the same speed in direct and reverse drive. When the tap has reached the specified depth, movement of the spindle of the machine is stopped without stopping the rotation. The tap is still turning in the work and it pulls the spindle down the small amount necessary to bring the drive balls into neutral position after which the engagement can then be made in the manner described for reverse operation.

The foregoing disclosure is representative of a preferred form of the invention and is to be interpreted in an illustrative rather than a limiting sense, the invention to be accorded the full scope of the claims appended hereto.

I claim:

1. In coupling means for transmitting torque in combination of first rotating member, a second axially aligned rotating member, said members being relatively movable axially, means for transmitting rotary drive from one member to another, said means including at least one ball member positioned between the members, and both members having configurations engageable with the ball member whereby drive is transmitted through the ball member, a circular holder for the ball member carried to be movable axially, a third axially aligned rotating member rotating in a reverse direction and having configurations that can engage the ball member, said circular holder being movable whereby the ball member can engage one or the other of oppositely rotating members.

2. Coupling means as in claim 1, wherein said configurations on the said second and third members are axial splines, which are spaced apart angularly by amounts greater than the diameter of the said ball member.

3. Coupling means as in claim 2, wherein the said axial splines have ball engaging surfaces that are arcuate in cross-section having a radius of curvature to accommodate rolling movement of the ball member.

4. Coupling means as in claim 2, said second rotating member having telescoping relationship relative to the first and third rotating members, said ball members being engaged between rotating members whereby to roll and move axially and to move the said holder axially upon relative axial movement of the rotary members.

5. Coupling means as in claim 1, said circular holder for the ball member being carried by the second rotating member.

6. Coupling means as in claim 5, including resilient means positioned for axial movement of the circular holder against the resilient means.

7. Coupling means as in claim 6, wherein said resilient means is positioned to resist said axial movement of the holder and to reposition said holder upon the ball moving in said disengaging relationship.

8. Coupling means as in claim 1, including a plurality of said ball members, and said second and third rotating members having a number of splines corresponding to the number of ball members.

9. In coupling means for transmitting torque, in combination, a first rotating member, a second axially aligned rotating member, said members being relatively movable axially, means for transmitting rotary drive from one member to the other, said means including at least one ball member positioned between the members, both members having axial configurations engageable with the ball member whereby drive is transmitted through the ball member, a circular carrier for said ball member, resilient means biasing the circuit carrier, said ball member having rolling engagement to move said carrier against said resilient means upon relative axial movement of said rotating members, said circular carrier and said resilient biasing means being carried by the second axially aligned rotating member.

10. Coupling means as in claim 9, wherein the said second axially aligned rotating member is the spindle of a tapping attachment.

11. Coupling means as in claim 9, including a tapping attachment having the first and second axially aligned rotating members, said tapping attachment having a third rotating member and means for rotating it in a reverse direction, and means whereby the rotary drive transmitting means is positionable to transmit the direct or reverse drives to the said spindle.

12. Coupling means as in claim 11, said means for rotating in a reverse direction having axial configurations engageable with the ball member, the said ball member being positionable to provide driving engagement between configurations on the second and third rotating members.

13. Coupling means as in claim 9 wherein said resilient biasing means includes biasing elements positioned on both sides of the circular carrier whereby the carrier can move axially in either direction.

* * * * *